(12) United States Patent
Huang et al.

(10) Patent No.: US 12,013,994 B1
(45) Date of Patent: Jun. 18, 2024

(54) TOUCHPAD MODULE AND COMPUTING DEVICE USING SAME

(71) Applicant: Primax Electronics Ltd., Taipei (TW)

(72) Inventors: Wei-Chiang Huang, Taipei (TW); Chao-Wei Lee, Taipei (TW); Hsueh-Chao Chang, Taipei (TW); Chieh-Hung Hsieh, Taipei (TW); Sian-Yi Chiu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/139,613

(22) Filed: Apr. 26, 2023

(30) Foreign Application Priority Data

Apr. 17, 2023 (TW) .................................. 112114275

(51) Int. Cl.
*G06F 3/03* (2006.01)
*G06F 1/16* (2006.01)
*G06F 3/0354* (2013.01)
*G06F 3/038* (2013.01)
*H05F 1/00* (2006.01)

(52) U.S. Cl.
CPC .......... *G06F 3/03547* (2013.01); *G06F 1/169* (2013.01); *G06F 3/0383* (2013.01); *H05F 1/00* (2013.01)

(58) Field of Classification Search
CPC .... G06F 3/03547; G06F 1/169; G06F 3/0383; G06F 3/03; H05F 1/00
See application file for complete search history.

(56) References Cited

U.S. PATENT DOCUMENTS

| | | | | |
|---|---|---|---|---|
| 6,281,887 B1* | 8/2001 | Wang | .................. | G06F 3/03547 |
| | | | | 345/173 |
| 7,920,225 B2* | 4/2011 | Nishikawa | ............ | G06F 1/1626 |
| | | | | 349/12 |
| 10,684,705 B1* | 6/2020 | Huang | .................. | G06F 3/0414 |
| 11,402,931 B1* | 8/2022 | Lee | ........................ | G06F 1/1616 |
| 2016/0091972 A1* | 3/2016 | Patel | ....................... | G06F 3/041 |
| | | | | 345/173 |
| 2020/0050241 A1* | 2/2020 | Uang | ..................... | G06F 1/1656 |

* cited by examiner

*Primary Examiner* — Lunyi Lao
*Assistant Examiner* — Jarurat Suteerawongsa
(74) *Attorney, Agent, or Firm* — KIRTON McCONKIE; Evan R. Witt

(57) ABSTRACT

A touchpad module for a computing device is provided. The touchpad module is installed within a fixing frame of the computing device. The touchpad module includes a base plate, a touch member, a conductive supporting structure, a first adhesive layer, a second adhesive layer and a conducting element. The touch member is located over the base plate. The conductive supporting structure is arranged between the base plate and the touch member. The conducting element is connected between the base plate and the fixing frame of the computing device. An electrostatic discharge path is defined by the touch member, the conductive supporting structure, the base plate, the conducting element and the fixing frame of the computing device collaboratively. In addition, static electricity generated on the touch member is guided out of the touchpad module through the electrostatic discharge path.

6 Claims, 4 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device. For example, in case that the user's finger is placed on the touchpad and slid on the touchpad, a cursor shown on a display screen is correspondingly moved. Moreover, in case that the touchpad is pressed down by the user's finger, the electronic device executes a specified function. The use of the touchpad can implement some functions of the conventional mouse. In other words, the user may operate the electronic device through the touchpad without the need of additionally carrying or installing the mouse.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function.

FIG. 2 is a schematic cross-sectional view illustrating the touchpad module as shown in FIG. 1. As shown in FIG. 2, a fixing frame 24 is concavely formed in the casing 21 of the notebook computer 2. The touchpad module 1 is disposed within the fixing frame 24. The touchpad module 1 comprises a base plate 11, a supporting structure 12, a touch member 13, a pressure sensor 14, a first conductive cloth 15 and a second conductive cloth 16.

The supporting structure 12 is adhered and fixed in the space between the base plate 11 and the touch member 13 by a glue dispensing process. The pressure sensor 14 is installed on the base plate 11. When the touch member 13 is pressed by the user and the touch member 13 is moved downwardly, the supporting structure 12 is correspondingly moved downwardly to push the base plate 11. Consequently, the base plate 11 is subjected to deformation, and the base plate 11 has a deformation amount. According to the deformation amount of the base plate 11, the pressing force exerted on the touch member 13 is sensed by the pressure sensor 14. Consequently, the pressure sensor 14 generates a pressure sensing signal. The first conductive cloth 15 is connected between the touch member 13 and the base plate 11. The second conductive cloth 16 is connected between the base plate 11 and the fixing frame 24 of the notebook computer 2.

An electrostatic discharge path is defined by the touch member 13, the first conductive cloth 15, the base plate 11, the second conductive cloth 16 and the fixing frame 24 of the notebook computer 2 collaboratively. When the touchpad module 1 is in a usage state, the static electricity generated by the touchpad module I can be guided to the outside region of the touchpad module 1 through the electrostatic discharge path. Consequently, the pressure sensor 14 or other internal electronic components will not be damaged by the static electricity.

However, since the structure of establishing the electrostatic discharge path through the first conductive cloth 15 and the second conductive cloth 16 is complicated, the steps of the overall manufacturing process is complicated, and the fabricating cost is largely increased.

In accordance with an assembling process of the conventional touchpad module 1, the glue is firstly dispensed to the region between the touch member 13 and the supporting structure 12, and then the touch member 13 and the supporting structure 12 are sent into an oven to be baked. After the dispensed glue between the touch member 13 and the supporting structure 12 is solidified, a semi-finished product is formed. After the semi-finished product is removed from the oven, the glue is dispensed to the region between the base plate 11 and the supporting structure 12, and then the base plate 11 and the supporting structure 12 are sent into the oven to be baked. After the dispensed glue between the base plate 11 and the supporting structure 12 is solidified, the assembling process is completed. As known, this assembling process is very complicated. In addition, the capacity of the oven limits the mass production of the combined structure of the touch member 13, the supporting structure 12 and the base plate 11. In other words, the production line is full of so many semi-finished products to be baked.

Therefore, there is a need of providing an improved touchpad module in order to overcome the above drawbacks.

SUMMARY OF THE INVENTION

An object of the present invention provides a touchpad module. The structural design of the touchpad module is simple. In addition, the touchpad module can be assembled easily. Consequently, the overall fabricating process is simplified, and the fabricating cost is largely reduced.

The other objects and advantages of the present invention will be understood from the disclosed technical features.

In accordance with an aspect of the present invention, a touchpad module for a computing device is provided. The touchpad module is installed within a fixing frame of the computing device. The touchpad module includes a base plate, a touch member, a conductive supporting structure, a first adhesive layer, a second adhesive layer and a conducting element. The touch member is located over the base plate. The conductive supporting structure is arranged between the base plate and the touch member. The first adhesive layer is arranged between the conductive supporting structure and the touch member. The second adhesive layer is arranged between the conductive supporting structure and the base plate. The conducting element is connected between the base plate and the fixing frame of the computing device. An electrostatic discharge path is defined by the touch member, the conductive supporting structure, the base plate, the conducting element and the fixing frame of the computing device collaboratively. In addition, static electricity generated on the touch member is guided out of the touchpad module through the electrostatic discharge path.

In an embodiment, the conducting element is made of conductive cloth.

In an embodiment, the conductive supporting structure has a first surface and a second surface, which are opposed to each other. The first surface of the conductive supporting structure faces the touch member. The second surface of the conductive supporting structure faces the base plate. The first adhesive layer is installed on the first surface of the conductive supporting structure. The second adhesive layer is installed on the second surface of the conductive supporting structure. The conductive supporting structure and the touch member are combined together through the first adhesive layer. The conductive supporting structure and the base plate are combined together through the second adhesive layer.

In an embodiment, the touchpad module further includes a pressure sensor. The pressure sensor is installed on the base plate. When an external pressing force is exerted on the touch member, the touch member is moved in a direction toward the base plate. While the touch member is moved in the direction toward the base plate, the conductive supporting structure is correspondingly moved with the touch member to push the base plate. Consequently, the base plate is subjected to deformation, and the base plate has a deformation amount. When the pressing force exerted on the touch member is sensed by the pressure sensor according to the deformation amount, the pressure sensor generates a pressure sensing signal.

In an embodiment, the base plate includes an elastic arm. The elastic arm is aligned with the conductive supporting structure. The pressure sensor is installed on the elastic arm. While the touch member is moved in the direction toward the base plate, the conductive supporting structure is correspondingly moved with the touch member to push the elastic arm of the base plate. Consequently, the elastic arm is subjected to the deformation, and the elastic arm has the deformation amount. When the pressing force exerted on the touch member is sensed by the pressure sensor according to the deformation amount, the pressure sensor generates the pressure sensing signal.

In an embodiment, the touch member includes a touch sensitive circuit board and a touch plate. The touch plate is located over the touch sensitive circuit board. The conductive supporting structure is arranged between the touch sensitive circuit board and the base plate.

In an embodiment, the conductive supporting structure is made of conductive rubber.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a base plate, a touch member, a conductive supporting structure, a first adhesive layer, a second adhesive layer and a conducting element. The touch member is located over the base plate. The conductive supporting structure is arranged between the base plate and the touch member. The first adhesive layer is arranged between the conductive supporting structure and the touch member. The second adhesive layer is arranged between the conductive supporting structure and the base plate. The conducting element is connected between the base plate and the fixing frame of the computing device. An electrostatic discharge path is defined by the touch member, the conductive supporting structure, the base plate, the conducting element and the fixing frame of the computing device collaboratively. In addition, static electricity generated on the touch member is guided out of the touchpad module through the electrostatic discharge path.

From the above descriptions, the present invention provides the touchpad module. The touchpad module is equipped with the conductive supporting structure between the touch member and the base plate and equipped with the conducting element between the base plate and the fixing frame of the computing device. Consequently, the electrostatic discharge path is defined. Due to this structural design, the structure of the touchpad module is simplified, and the electrostatic discharge path is effectively shortened. Moreover, since the conductive supporting structure is directly adhered and fixed in the space between the touch member and the base plate in the adhesive bonding manner, the baking and solidifying step in the oven can be omitted. Consequently, the manufacturing process of the touchpad module is effectively simplified. The structural design of the touchpad module of the present invention is simple. In addition, the touchpad module can be assembled easily. Consequently, the fabricating cost is largely reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
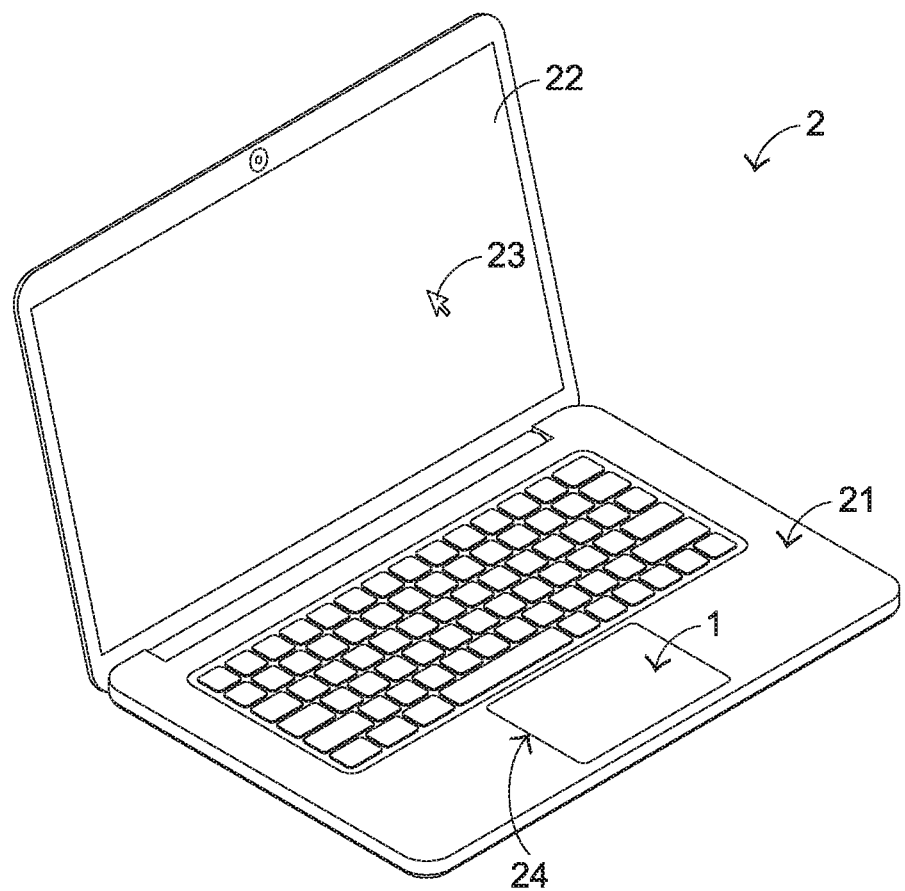
FIG. 1 schematically illustrates a conventional notebook computer with a touchpad module.
Figure 2:
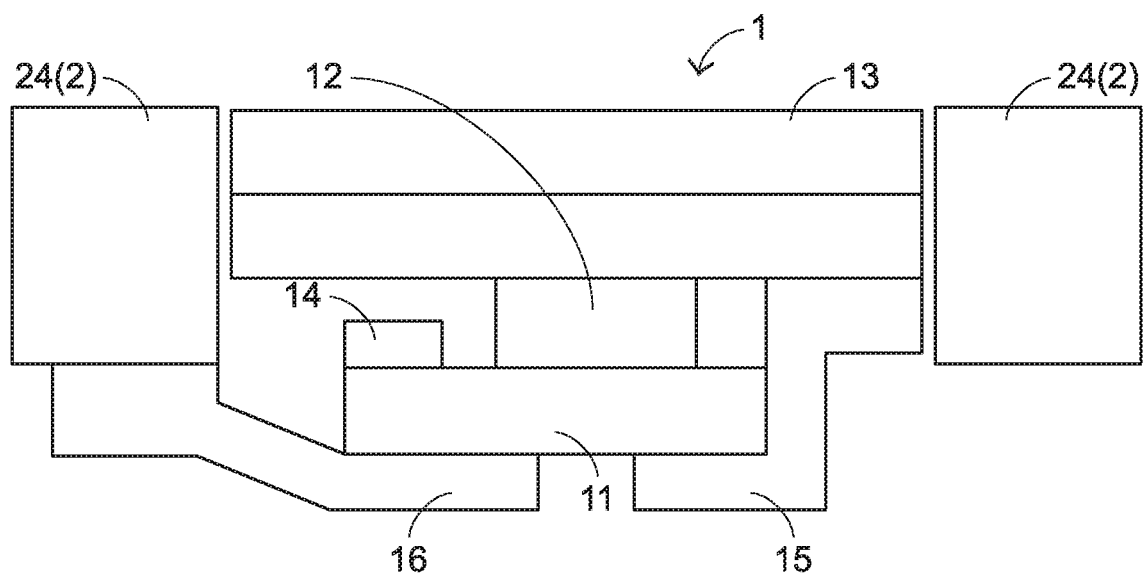
FIG. 2 is a schematic cross-sectional view illustrating the touchpad module as shown in FIG. 1.
Figure 3:
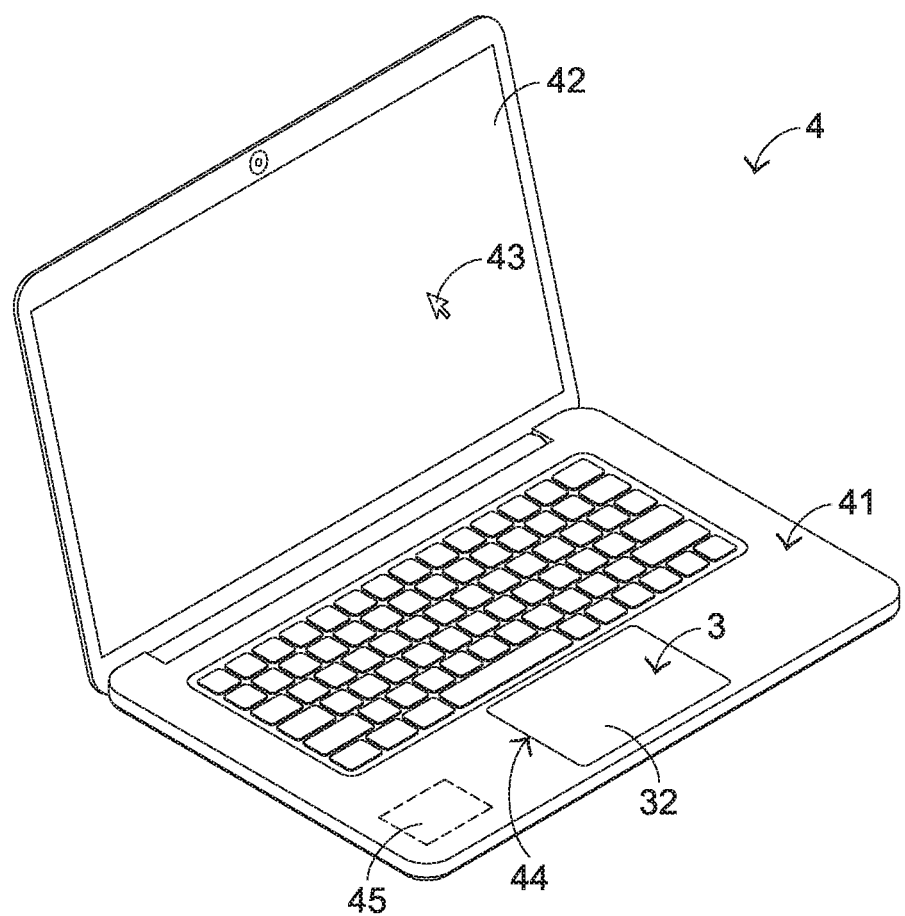
FIG. 3 is a schematic perspective view illustrating the outer appearance of a computing device with a touchpad module according to an embodiment of the present invention.

FIG. 3 is a schematic perspective view illustrating the outer appearance of a computing device with a touchpad module according to an embodiment of the present invention. An example of the computing device 3 includes but is not limited to a notebook computer. In an embodiment, the computing device 4 comprises a casing 41, a display screen 42, a processor 45 and a touchpad module 3. The processor 45 is disposed within the casing 41. The processor 45 is used for processing electronic signals of the computing device 4. Moreover, a fixing frame 44 is concavely formed in the casing 41. The touchpad module 3 is disposed within the fixing frame 44 and electrically connected with the processor 45. When the touchpad module 3 is disposed within the fixing frame 44, at least a portion of the touchpad module 3 is exposed outside so as to be touched by the user's finger. Consequently, the user can operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed down by the user's finger, the computing device 4 executes a specified function.

The other structure of the touchpad module 3 will be described in more details as follows.

Figure 4:
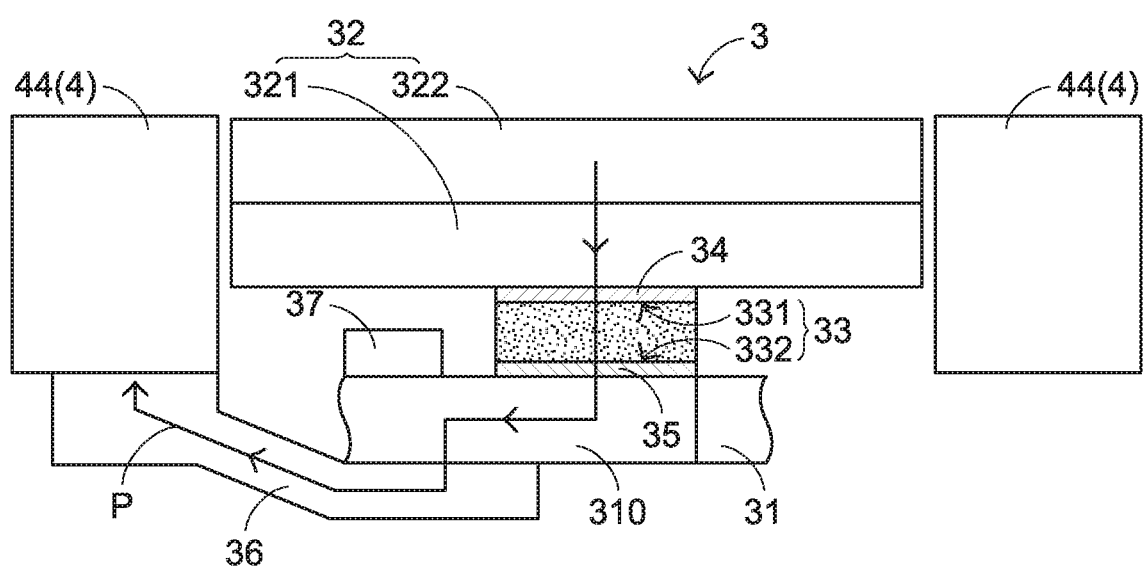
FIG. 4 is a schematic cross-sectional view illustrating the touchpad module as shown in FIG. 3.

FIG. 4 is a schematic cross-sectional view illustrating the touchpad module as shown in FIG. 3. As shown in FIG. 4, the touchpad module 3 comprises a base plate 31, a touch member 32, a conductive supporting structure 33, a first adhesive layer 34, a second adhesive layer 35 and a conducting element 36.

The touch member 32 is located over the base plate 31. The conductive supporting structure 33 is arranged between the base plate 31 and the touch member 32. The first adhesive layer 34 is arranged between the conductive supporting structure 33 and the touch member 32. The second adhesive layer 35 is arranged between the conductive supporting structure 33 and the base plate 31. In addition, the conducting element 36 is connected between the base plate 31 and the fixing frame 44 of the computing device 4.

In this embodiment, an electrostatic discharge path P is defined by the touch member 32, the conductive supporting structure 33, the base plate 31, the conducting element 36 and the fixing frame 44 of the computing device 4 collaboratively. When the touch member 32 is touched by the user's hand or the touch member 32 is contacted with other objects, static electricity is generated. The static electricity can be guided to the outside region of the touchpad module 3 through the electrostatic discharge path P. In other words, the static electricity is guided out through the touch member 32, the conductive supporting structure 33, the base plate 31 and the fixing frame 44 of the computing device 4.

For example, the conductive supporting structure 33 is made of conductive rubber or any other appropriate material. The conducting element 36 is made of conductive cloth or any other appropriate material. Moreover, the base plate 31 is made of metallic material or any other appropriate material.

As mentioned above, the touchpad module 3 is equipped with the conductive supporting structure 33 between the touch member 32 and the base plate 31. Due to the arrangement of the conductive supporting structure 33, the electrostatic discharge path between the touch member 32 and the base plate 31 is electrically conducted. In addition, the electrostatic discharge path between the base plate 31 and the fixing frame 44 of the computing device 4 is electrically conducted through the conducting element 36. Due to this structural design, the structure of the touchpad module 3 is simplified. In addition, the electrostatic discharge path is effectively shortened. Since the static electricity generated by the touch member 32 is quickly guided out of the touchpad module 3, the internal electronic components of the touchpad module 3 will not be influenced and damaged by static electricity.

Please refer to FIG. 4 again. In an embodiment, the touch member 32 comprises a touch sensitive circuit board 321 and a touch plate 322. The touch plate 322 is located over the touch sensitive circuit board 321. The conductive supporting structure 33 is adhered and fixed in the space between the touch sensitive circuit board 321 and the base plate 31 through the first adhesive layer 34 and the second adhesive layer 35. Preferably but not exclusively, the touch plate 322 is made of glass or any other appropriate material. The material of the touch plate 322 may be varied according to the practical requirements. Moreover, the touch sensitive circuit board 321 and the touch plate 322 are combined together through a pressure sensitive adhesive (PSA) or any other appropriate material.

Please refer to FIG. 4 again. In an embodiment, the conductive supporting structure 33 has a first surface 331 and a second surface 332, which are opposed to each other. The first surface 331 of the conductive supporting structure 33 faces the touch member 32. The second surface 332 of the conductive supporting structure 33 faces the base plate 31. The first adhesive layer 34 is installed on the first surface 331 of the conductive supporting structure 33. The second adhesive layer 35 is installed on the second surface 332 of the conductive supporting structure 33. The conductive supporting structure 33 and the touch member 32 are combined together through the first adhesive layer 34. The conductive supporting structure 33 and the base plate 31 are combined together through the second adhesive layer 35.

As mentioned above, in the touchpad module 3 of the present invention, the conductive supporting structure 33 is directly adhered and fixed in the space between the touch sensitive circuit board 321 and the base plate 31 in the adhesive bonding manner. Due to this structural design, the baking and solidifying step in the oven can be omitted from the manufacturing process of the touchpad module 3. Since the manufacturing process of the touchpad module 3 is effectively simplified, the fabricating cost is reduced.

Please refer to FIG. 4 again. In an embodiment, the touchpad module 3 further comprises at least one pressure sensor 37. The pressure sensor 37 is installed on the base plate 31. According to the deformation amount of the base plate 31, the pressing force exerted on the touch member 32 is sensed by the pressure sensor 37. For example, while the touch member 32 is moved in the direction toward the base plate 31 in response to the external pressing force, the conductive supporting structure 33 is correspondingly moved with the touch member 32 to push the base plate 31. Since the base plate 31 is subjected to deformation, the base plate 31 has the deformation amount. According to the deformation amount of the base plate 31, the pressing force exerted on the touch member 32 is sensed by the pressure sensor 37. Consequently, the pressure sensor 37 generates the pressure sensing signal.

In an embodiment, the pressure sensor 37 is electrically connected with the touch sensitive circuit board 321 of the touch member 32 through a flexible circuit board (not shown). After the pressing force exerted on the touch member 32 is sensed by the pressure sensor 37 and the pressure sensing signal is generated, the pressure sensing signal is transmitted to the touch sensitive circuit board 321 through the flexible circuit board. Then, the pressure sensing signal is transmitted from the touch sensitive circuit board 321 to the processor 45 of the computing device 4 to be further processed.

Please refer to FIG. 4 again. In an embodiment, the base plate 31 comprises at least one elastic arm 310. The elastic arm 310 is aligned with the conductive supporting structure 33. The pressure sensor 37 is installed on the elastic arm 310. In an embodiment, the elastic arm 310 is formed on a position of the base plate 31 corresponding to the conductive supporting structure 33 by a stamping process. In response to the external pressing force, the elastic arm 310 is swung relative to the base plate 31. Consequently, the elastic arm 310 is subjected to deformation. While the touch member 32 is moved in the direction toward the base plate 31 in response to the external pressing force, the conductive supporting structure 33 is correspondingly moved with the touch member 32 to push the elastic arm 310 of the base plate 31. Since the elastic arm 310 is swung downwardly and subjected to the deformation, the elastic arm 310 has a deformation amount. According to the downward deformation amount of the elastic arm 310, the pressing force exerted on the touch member 32 is sensed by the pressure sensor 37. Consequently, the pressure sensor 37 generates the pressure sensing signal.

It is noted that the number of the at least one pressure sensor 37 and the number of the at least one elastic arm 310 are not restricted. For example, in some other embodiments, the touchpad module 3 comprises two or more than two pressure sensors 37 and two or more than two elastic arms 310 according to the practical requirements.

From the above descriptions, the present invention provides the touchpad module. The touchpad module is equipped with the conductive supporting structure between the touch member and the base plate and equipped with the conducting element between the base plate and the fixing frame of the computing device. Consequently, the electrostatic discharge path is defined. Due to this structural design, the structure of the touchpad module is simplified, and the electrostatic discharge path is effectively shortened. Moreover, since the conductive supporting structure is directly adhered and fixed in the space between the touch member and the base plate in the adhesive bonding manner, the baking and solidifying step in the oven can be omitted. Consequently, the manufacturing process of the touchpad module is effectively simplified. The structural design of the touchpad module of the present invention is simple. In addition, the touchpad module can be assembled easily. Consequently, the fabricating cost is largely reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:
   a base plate comprises an elastic arm;
   a touch member located over the base plate;
   a conductive supporting structure arranged between the elastic arm and the touch member, wherein the elastic arm is aligned with the conductive supporting structure in a thickness direction of the touchpad module;
   a first adhesive layer arranged between the conductive supporting structure and the touch member;
   a second adhesive layer arranged between the conductive supporting structure and the elastic arm; and
   a conducting element connected between the base plate and the fixing frame of the computing device,
   wherein an electrostatic discharge path is defined by the touch member, the conductive supporting structure, the base plate, the conducting element and the fixing frame of the computing device collaboratively, and static electricity generated on the touch member is guided out of the touchpad module through the electrostatic discharge path;
   wherein the touchpad module further comprises a pressure sensor, and the pressure sensor is installed on the elastic arm, wherein when an external pressing force is exerted on the touch member, the touch member is moved in a direction toward the base plate, wherein while the touch member is moved in the direction toward the base plate, the conductive supporting structure is correspondingly moved with the touch member to push the base plate, so that the base plate is subjected to deformation and the base plate has a deformation amount, wherein when the pressing force exerted on the touch member is sensed by the pressure sensor according to the deformation amount, the pressure sensor generates a pressure sensing signal;
   wherein while the touch member is moved in the direction toward the base plate, the conductive supporting structure is correspondingly moved with the touch member to push the elastic arm of the base plate, so that the elastic arm is subjected to the deformation and the elastic arm has the deformation amount, wherein when the pressing force exerted on the touch member is sensed by the pressure sensor according to the deformation amount, the pressure sensor generates the pressure sensing signal.

2. The touchpad module according to claim 1, wherein the conducting element is made of conductive cloth.

3. The touchpad module according to claim 1, wherein the conductive supporting structure has a first surface and a second surface, which are opposed to each other, wherein the first surface of the conductive supporting structure faces the touch member, the second surface of the conductive supporting structure faces the base plate, the first adhesive layer is installed on the first surface of the conductive supporting structure, and the second adhesive layer is installed on the second surface of the conductive supporting structure, wherein the conductive supporting structure and the touch member are combined together through the first adhesive layer, and the conductive supporting structure and the base plate are combined together through the second adhesive layer.

4. The touchpad module according to claim 1, wherein the touch member comprises a touch sensitive circuit board and a touch plate, wherein the touch plate is located over the touch sensitive circuit board, and the conductive supporting structure is arranged between the touch sensitive circuit board and the base plate.

5. The touchpad module according to claim 1, wherein the conductive supporting structure is made of conductive rubber.

6. A computing device, comprising:
   a casing, wherein a fixing frame is concavely formed in the casing;
   a processor disposed within the casing; and a touchpad module disposed within the fixing frame and electrically connected with the processor, wherein the touchpad module comprises:
   a base plate comprises an elastic arm;
   a touch member located over the base plate;
   a conductive supporting structure arranged between the elastic arm and the touch member, wherein the elastic arm is aligned with the conductive supporting structure in a thickness direction of the touchpad module;
   a first adhesive layer arranged between the conductive supporting structure and the touch member;
   a second adhesive layer arranged between the conductive supporting structure and the elastic arm;
   a conducting element connected between the base plate and the fixing frame of the computing device,
   wherein an electrostatic discharge path is defined by the touch member, the conductive supporting structure, the base plate, the conducting element and the fixing frame of the computing device collaboratively, and static electricity generated on the touch member is guided out of the touchpad module through the electrostatic discharge path;

wherein the touchpad module further comprises a pressure sensor, and the pressure sensor is installed on the elastic arm, wherein when an external pressing force is exerted on the touch member, the touch member is moved in a direction toward the base plate, wherein while the touch member is moved in the direction toward the base plate, the conductive supporting structure is correspondingly moved with the touch member to push the base plate, so that the base plate is subjected to deformation and the base plate has a deformation amount, wherein when the pressing force exerted on the touch member is sensed by the pressure sensor according to the deformation amount, the pressure sensor generates a pressure sensing signal;

wherein while the touch member is moved in the direction toward the base plate, the conductive supporting structure is correspondingly moved with the touch member to push the elastic arm of the base plate, so that the elastic arm is subjected to the deformation and the elastic arm has the deformation amount, wherein when the pressing force exerted on the touch member is sensed by the pressure sensor according to the deformation amount, the pressure sensor generates the pressure sensing signal.

\* \* \* \* \*